United States Patent
Umezawa

(10) Patent No.: US 8,546,000 B2
(45) Date of Patent: Oct. 1, 2013

(54) PERPENDICULAR MAGNETIC DISC

(75) Inventor: Teiichiro Umezawa, Singapore (SG)

(73) Assignee: WD Media, LLC, San Jose, CA (US)

( * ) Notice: Subject to any disclaimer, the term of this patent is extended or adjusted under 35 U.S.C. 154(b) by 89 days.

(21) Appl. No.: 13/096,307

(22) Filed: Apr. 28, 2011

(65) Prior Publication Data

US 2011/0268990 A1    Nov. 3, 2011

(30) Foreign Application Priority Data

Apr. 30, 2010 (JP) ................. 2010-104704

(51) Int. Cl.
*G11B 5/66* (2006.01)
(52) U.S. Cl.
USPC .......................... 428/829; 428/830
(58) Field of Classification Search
None
See application file for complete search history.

(56) References Cited

U.S. PATENT DOCUMENTS

| | | | |
|---|---|---|---|
| 7,976,965 B2* | 7/2011 | Shimizu et al. | 428/828.1 |
| 8,202,636 B2* | 6/2012 | Choe et al. | 428/828.1 |
| 8,367,229 B2* | 2/2013 | Sasaki | 428/829 |
| 2006/0204791 A1* | 9/2006 | Sakawaki et al. | 428/828.1 |
| 2007/0248843 A1* | 10/2007 | Wu et al. | 428/827 |
| 2010/0209741 A1* | 8/2010 | Sasaki et al. | 428/846.8 |
| 2012/0066896 A1* | 3/2012 | Kajiwara et al. | 29/603.01 |
| 2012/0129009 A1* | 5/2012 | Sato et al. | 428/848 |
| 2012/0189872 A1* | 7/2012 | Umezawa et al. | 428/828.1 |

* cited by examiner

*Primary Examiner* — Kevin Bernatz

(57) ABSTRACT

A perpendicular magnetic disk that includes, a base 110, a granular magnetic layer 160, and a auxiliary recording layer 180 disposed as an upper layer of the granular magnetic layer 160. The granular magnetic layer 160 has a granular structure in which a grain boundary portion is formed by segregation of a non-magnetic substance containing an oxide as a main component around magnetic particles containing a CoCrPt alloy grown in a columnar shape as a main component. The auxiliary recording layer 180 contains a CoCrPtRu alloy as a main component and has a film thickness of 1.5 nm to 4.0 nm. With this structure, the auxiliary recording layer can be thinned while maintaining the function thereof to improve SNR.

6 Claims, 5 Drawing Sheets

FIG. 3

| | FILM THICKNESS [nm] | AUXILIARY RECORDING LAYER | | | MS [emu/cm3] | SNR [dB] |
| --- | --- | --- | --- | --- | --- | --- |
| | | Cr CONTENT [atm%] | Ru CONTENT [atm%] | TOTAL SUM =Cr[atm%] +0.65Ru [atm%] | | |
| COMPARATIVE EXAMPLE1 | 1.3 | 6 | 6 | 9.9 | 625 | 13.2 |
| EXAMPLE1 | 1.5 | 6 | 6 | 9.9 | 625 | 16.2 |
| EXAMPLE2 | 3.0 | 6 | 6 | 9.9 | 625 | 17.0 |
| EXAMPLE3 | 4.0 | 6 | 6 | 9.9 | 625 | 16.7 |
| COMPARATIVE EXAMPLE2 | 5.4 | 6 | 6 | 9.9 | 625 | 15.8 |
| COMPARATIVE EXAMPLE3 | 2.5 | 3 | 5 | 6.3 | 780 | 15.8 |
| EXAMPLE4 | 2.5 | 4 | 5 | 7.3 | 745 | 16.2 |
| EXAMPLE5 | 2.5 | 8 | 5 | 11.3 | 575 | 16.4 |
| COMPARATIVE EXAMPLE4 | 2.5 | 9 | 5 | 12.3 | 530 | 15.8 |
| COMPARATIVE EXAMPLE5 | 2.5 | 5 | 2 | 6.3 | 785 | 15.7 |
| EXAMPLE6 | 2.5 | 5 | 3 | 7.0 | 750 | 16.3 |
| EXAMPLE7 | 2.5 | 5 | 10 | 11.5 | 565 | 16.3 |
| COMPARATIVE EXAMPLE6 | 2.5 | 5 | 11 | 12.2 | 540 | 15.9 |
| COMPARATIVE EXAMPLE7 | 2.5 | 6 | 10 | 12.5 | 520 | 15.7 |
| COMPARATIVE EXAMPLE8 | 2.5 | 4 | 3 | 6.0 | 800 | 15.3 |

| | ADDITIVE SUBSTANCE | ADDITIVE SUBSTANCE AMOUNT [at%] | SATURATION MAGNETIZATION [emu/cm3] |
|---|---|---|---|
| 68Co-15Pt-5B-12Ru | Ru | 12 | 714 |
| 70Co-15Pt-5B-10Ru | Ru | 10 | 790 |
| 72Co-15Pt-5B-8Ru | Ru | 8 | 832 |
| 77Co-15Pt-5B-3Ru | Ru | 3 | 969 |
| 78Co-15Pt-5B-2Ru | Ru | 2 | 1009 |
| 80Co-15Pt-5B | - | 0 | 1049 |
| 62Co-15Pt-5B-18Cr | Cr | 18 | 336 |
| 63Co-15Pt-5B-17Cr | Cr | 17 | 364 |
| 62.5Co-15Pt-5B-17.5Cr | Cr | 17.5 | 345 |
| 60Co-15Pt-5B-20Cr | Cr | 20 | 206 |
| 61Co-15Pt-5B-19Cr | Cr | 19 | 274 |
| 63Co-15Pt-5B-17Cr | Cr | 17 | 361 |
| 70Co-15Pt-5B-10Cr | Cr | 10 | 625 |
| 75Co-15Pt-5B-5Cr | Cr | 5 | 890 |
| 80Co-15Pt-5B | - | 0 | 1049 |

FIG. 5

| | Ru CONCENTRATION IN GRANULAR MAGNETIC LAYER [atm%] | AUXILIARY RECORDING LAYER | | | | | |
|---|---|---|---|---|---|---|---|
| | | FILM THICKNESS [nm] | Cr CONTENT [atm%] | Ru CONTENT [atm%] | TOTAL SUM =Cr[atm%] +0.65Ru [atm%] | MS [emu/cm3] | SNR [dB] |
| EXAMPLE8 | 0 | 1.8 | 6 | 6 | 9.9 | 625 | 16.1 |
| EXAMPLE9 | 1 | 1.8 | 6 | 6 | 9.9 | 625 | 16.3 |
| EXAMPLE10 | 3 | 1.8 | 6 | 6 | 9.9 | 625 | 16.7 |
| EXAMPLE11 | 5 | 1.8 | 6 | 6 | 9.9 | 625 | 16.2 |
| EXAMPLE12 | 6 | 1.8 | 6 | 6 | 9.9 | 625 | 16.0 |

PERPENDICULAR MAGNETIC DISC

TECHNICAL FIELD

The present invention relates to a perpendicular magnetic disk to be mounted on an HDD (hard disk drive) or the like of a perpendicular magnetic recording type.

BACKGROUND ART

With an increase in capacity of information processing in recent years, various information recording technologies have been developed. In particular, the surface recording density of an HDD using a magnetic recording technology is continuously increasing at an annual rate of approximately 60%. In recent years, an information recording capacity exceeding 320 gigabytes per platter has been demanded in a perpendicular magnetic recording medium with a 2.5 inch diameter for use in an HDD or the like. To fulfill such a demand, an information recording density exceeding 500 GBit/square inch is desired to be achieved.

Important factors for achieving a high recording density in a perpendicular magnetic disk include securement of electromagnetic conversion characteristics such as improvement in TPI (Tracks per Inch) achieved by narrowing a track width, an SNR (Signal to Noise Ratio) at an improvement time of BPI (Bits per Inch), or an overwrite characteristic (OW characteristic), further, securement of resistance to thermal fluctuation in such a state that a recording bit has become small due to the above-described matter, and the like. Of them, improvement in SNR under a high recording density condition is important.

Since a granular magnetic layer forms fine particles due to separation of an oxide phase and a metal phase from each other, it is effective for achieving a high SNR. Though particles in the granular magnetic layer must be made fine for achieving a high recording density, magnetic energy of particles also becomes small due to the fineness, which results in a problem of the thermal fluctuation. On the other hand, in order to avoid the problem of the thermal fluctuation, it is necessary to enhance magnetic anisotropy in a medium, but since a coercive force becomes too high, writing becomes difficult. That is, the coercive force and the overwrite characteristic are originally in a tradeoff relationship, but there is a demand that both of them be improved.

In Patent Document 1, an auxiliary layer for writing (corresponding to an auxiliary recording layer) formed so as to be brought into contact with a main recording layer above or below the main recording layer has been proposed. In Patent Document 1, the main recording layer is a magnetic layer having a granular structure and the auxiliary layer for writing is composed of CoCr alloy (for example, CoCrPtB). In Patent Document 1, there is a description that both of the overwrite characteristic and the resistance to thermal fluctuation can be achieved by providing the auxiliary layer for writing.

PRIOR ART DOCUMENT

Patent Document

[Patent Document 1] Japanese Unexamined Patent Application Publication No. 2006-309922

DISCLOSURE OF INVENTION

Problems to be solved by the Invention

However, the auxiliary recording layer improves the overwrite characteristic and the resistance to thermal fluctuation, but since it has a magnetic continuity in an in-plane direction, it constitutes a noise source, where side fringing also becomes large. Therefore, the thicker, the film thickness of the auxiliary recording layer, the larger the noise becomes, which results in factor for blocking a high recording density. Further, when the film thickness of the auxiliary recording layer is thick, magnetic spacing between a magnetic head and a soft magnetic layer increases, conversely, a layer which should assist writing acts so as to block writing due to the film thickness thereof itself. Therefore, there is a demand for thinning the auxiliary recording layer in order to achieve reduction in noise and improvement in overwrite characteristic.

In order to thin the auxiliary recording layer without damaging a magnetic function thereof, it is thought to increase a saturation magnetization Ms of a material. This is because strength of the magnetic layer which is a thin film is determined according to a product of a saturation magnetization and a film thickness ($Ms \cdot t$), where t indicates the film thickness of the magnetic layer.

However, the auxiliary recording layer is not so simple as to be allowed to be thinned by increasing Ms, and there are problems that the auxiliary recording layer having increased Ms causes extreme reduction in SNR, and that the auxiliary recording layer thinned also causes extreme reduction in SNR. Therefore, it is conventionally forced to set the MS of the auxiliary recording layer to be relatively low while setting the film thickness to be relatively thick.

An object of the present invention is to thin the auxiliary recording layer while maintaining a function as the auxiliary recording layer, thereby achieving improvement in SNR.

Means for Solving the Problems

The inventor has conducted careful examination, and has found that, since the auxiliary recording layer is inherently continuing magnetically in an in-plane direction, c-axis must be oriented in a perpendicular direction to the auxiliary recording layer. On the other hand, a grain boundary containing an oxide as a main component is formed around magnetic crystal particles in the granular magnetic layer. Therefore, the inventors have considered that, if an auxiliary recording layer is formed on the granular magnetic layer, disturbance occurs in crystals in an initial growth stage of the auxiliary recording layer on the grain boundary, which results in lowering of crystallinity. It is also considered that, when a portion where crystallinity has lowered is present in the auxiliary recording layer, an increase amount of noise becomes larger in a material having a higher Ms, so that the SNR conventionally lowers according enhancement of the MS. Since increase of the film thickness generally tends to improve the crystallinity, it is thought that the reason why the film thickness must conventionally be made thick is because disturbance in crystals in the initial growth stage is compensated.

Therefore, the inventor has come up with the idea that, if the crystallinity can be improved even by adopting a thin film, it becomes possible to prevent the noise from increasing even if Ms is increased, and also to thin the auxiliary recording layer, and the inventor has accumulated further studies and has reached completion of the present invention.

That is, in order to solve the above problem, a representative configuration of a perpendicular magnetic disk according to the present invention includes, on a base, a granular magnetic layer, and an auxiliary recording layer disposed as an upper layer of the granular magnetic layer, wherein the granular magnetic layer has a granular structure in which a grain boundary portion is formed by segregation of a non-magnetic substance containing an oxide as a main component around magnetic particles containing a CoCrPt alloy grown in a columnar shape as a main component, and the auxiliary recording layer contains a CoCrPtRu alloy as a main component and has a film thickness of 1.5 nm to 4.0 nm.

According to the above configuration, since the crystallinity of the auxiliary recording layer can be improved by preparing the auxiliary recording layer containing a CoCrPtRu alloy as a main component, thinning can be achieved while performance required for the auxiliary recording layer is maintained. Furthermore, by forming the auxiliary recording layer in a thin film having a film thickness of about 1.5 nm to 4.0 nm, reduction in noise occurring from the auxiliary recording layer can be achieved. It should be noted that the "main component" in this patent application means a major component when an overall composition is represented by at % (or mol %).

It is preferred that the auxiliary recording layers contain 4 at % to 8 at % of Cr and 3 at % to 10 at % of Ru. Ms is further reduced by adding more Cr or Ru, but the auxiliary recording layer having Cr and Ru in the above ranges can obtain a good balance between high Ms and high crystallinity.

It is preferred that the auxiliary recording layer meets the requirement of 7 at %≤(Cr content+0.65×Ru content)≤12 at %. By setting the total sum of Cr and Ru contents in this range, saturation magnetization Ms suitable for thinning can be obtained. It is not preferred that the total sum of Cr and Ru contents is more than 12 at %, because Co decreases and Ms drops. It is not preferred either that the total sum of Cr and Ru contents is less than 7 at %, because Ms becomes so high that the auxiliary recording layer constitutes a noise source.

It is preferred that the auxiliary recording layer has a saturation magnetization Ms in the range of 550 [emu/cc] to 750 [emu/cc]. If Ms is less than 550, the overwrite characteristic decreases and the SNR deteriorates accordingly. On the other hand, if Ms is more than 750, the noise increases and the SNR decreases accordingly. Therefore, by setting Ms in the above range, the SNR can be increased while the function of the auxiliary recording layer is maintained.

It is preferred that the magnetic particles of the granular magnetic layer are caused to contain 1 at % to 5 at % of Ru. This improves the crystallinity of the granular magnetic layer, and accordingly the crystallinity of the auxiliary recording layer can be further improved from an initial growth stage, and therefore the SNR can be further improved.

It is preferred that a split layer containing a Ru alloy as a main component is provided between the granular magnetic layer and the auxiliary recording layer. By adjusting the film thickness of the split layer, the strength of a magnetic interaction (coupling) between the granular magnetic layer and the auxiliary recording layer can be adjusted. This can improve the overwrite characteristic, and therefore the auxiliary recording layer can be further thinned.

Effects of the Invention

According to the present invention, since the auxiliary recording layer contains a CoCrPtRu alloy as a main component, the crystallinity of the auxiliary recording layer can be improved, and therefore the auxiliary recording layer can be thinned while the function thereof is maintained. Furthermore, since the auxiliary recording layer is a thin film having a film thickness of about 1.5 nm to 4.0 nm, reduction in noise occurring from the auxiliary recording layer can be achieved.

FIG. 3 is a table for describing contents of Cr and Ru in an auxiliary recording layer composed of a CoCrPtRu alloy.

FIG. 5 is a table for describing the effect of the concentration of Ru contained in a granular magnetic layer.

BEST MODE FOR CARRYING OUT THE INVENTION

Figure 1:
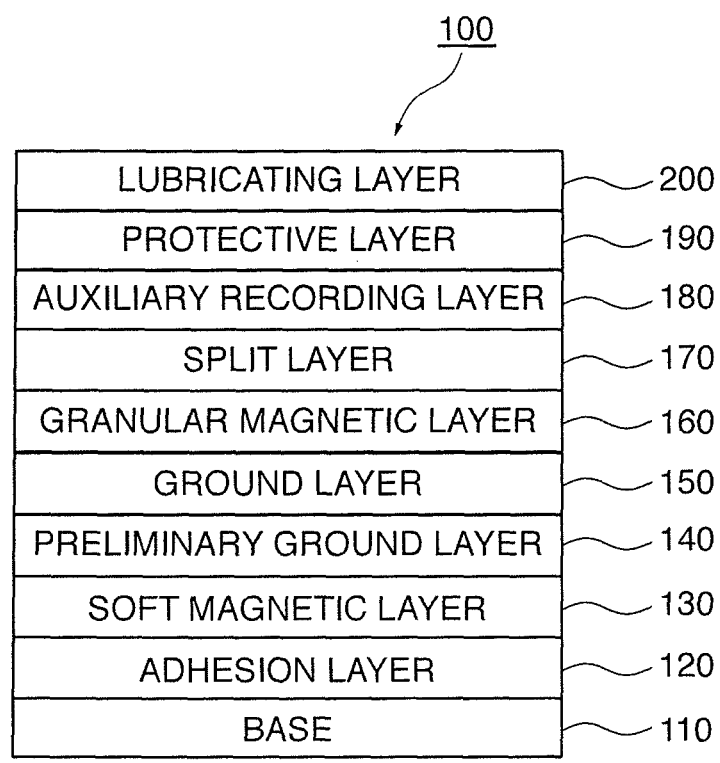
FIG. 1 is a diagram for describing the structure of a perpendicular magnetic disk.

Preferred embodiments of the present invention will be described in detail below with reference to the attached drawings. The dimensions, materials, and others such as specific numerical values shown in the embodiments are merely examples so as to facilitate understanding of the invention, and are not meant to restrict the present invention unless otherwise specified. Note that in the specification and the drawings, components having substantially the same functions and structures are provided with the same reference numerals and are not redundantly described, and components not directly relating to the present invention are not shown in the drawings.

First Embodiment (Perpendicular Magnetic Disk)

FIG. 1 is a diagram for describing the structure of a perpendicular magnetic disk 100 according to a first embodiment. The perpendicular magnetic disk 100 shown in FIG. 1 includes a base 110, an adhesion layer 120, a soft magnetic layer 130, a preliminary ground layer 140, a ground layer 150, a granular magnetic layer 160, a split layer 170, an auxiliary recording layer 180, a protective layer 190, and a lubricating layer 200.

As the base 110, a glass disk formed by molding an amorphous aluminosilicate glass in a disk form by direct pressing can be used. Note that the type, size, thickness, and others of the glass disk are not particularly restrictive. As a material of the glass disk, for example, an aluminosilicate glass, a soda lime glass, a soda aluminosilicate glass, an aluminoborosilicate glass, a borosilicate glass, a quartz glass, a chain silicate glass, or a glass ceramic, such as a crystallized glass, is used. On this glass disk, grinding, polishing, and chemical strengthening are sequentially performed, and a smooth non-magnetic base 110 formed of the chemically-strengthened glass disk can be obtained.

On the base 110, the adhesion layer 120 to the auxiliary recording layer 180 are sequentially formed by DC magnetron sputtering, and the protective layer 190 can be formed by CVD. Thereafter, the lubricating layer 200 can be formed by dip coating. The structure of each layer is described below.

The adhesion layer 120 is formed in contact with the base 110, including a function of increasing a close contact strength between the soft magnetic layer 130 formed on the adhesion layer 120 and the base 110. It is preferred that the adhesion layer 120 is an amorphous alloy film made from, for example, a CrTi-type amorphous alloy, a CoW-type amorphous alloy, a CrW-type amorphous alloy, a CrTa-type amorphous alloy, or a CrNb-type amorphous alloy. The film thickness of the adhesion layer 120 may be set in a range of, for example, about 2 to 20 nm. The adhesion layer 120 may be a monolayer or may be formed by laminating a plurality of layers.

The soft magnetic layer 130 serves to converge writing magnetic field from a head to assist writing ease of a signal into the magnetic recording layer and achievement of a high density when the signal is recorded in the perpendicular magnetic recording type. AS a soft magnetic material, a material exhibiting a soft magnetic characteristic, such as not only a cobalt-type alloy such as CoTaZr but also an FeCo-type alloy such as FeCoCrB, FeCoTaZr, or FeCoNiTaZr, or an NiFe-type alloy can be used. The soft magnetic layer 130 may be configured to have AFC (Antiferro-magnetic exchange coupling) by interposing a spacer layer composed of Ru in an approximately intermediate portion of the soft magnetic layer 130. Since perpendicular components of magnetization can be made considerably small by adopting such a configuration, noise occurring from the soft magnetic layer 130 can be reduced. In the configuration including the interposition of the spacer layer, the film thickness of the soft magnetic layer 130 may be set such that the spacer layer is in a range of about 0.3 to 0.9 nm and layers made of soft magnetic material and positioned above and below the spacer layer are in a range of about 10 to 50 nm, respectively.

The preliminary ground layer 140 includes a function of promoting a crystalline orientation of the ground layer 150 formed above the preliminary ground layer 140 and a function of controlling a fine structure such as a particle diameter or the like. The preliminary ground layer 140 may have the hcp structure, but it preferably has a face-centered cubic structure (fcc structure) where a (111) plane is oriented to be parallel with a main surface of the base 110. As a material of the preliminary ground layer 140, for example, Ni, Cu, Pt, Pd, Ru, Co, or Hf, or an alloy that contains a metal thereof as a main component and is added with at least one of V, Cr, Mo, W, Ta, and the like may be used. Specifically, NiV, NiCr, NiTa, NiW, NiVCr, CuW, CuCr, or the like can be selected preferably. The film thickness of the preliminary ground layer 140 may be set in a range of about 1 to 20 nm. Further, the preliminary ground layer 140 may have a multi-layered structure.

The ground layer 150 has the hcp structure, including a function of promoting a crystalline orientation of magnetic crystal particles in the hcp structure of the granular magnetic layer 160 formed above the ground layer 150 and a function of controlling a fine structure such as a particle diameter or the like, and is a layer serving as the so-called base for the granular structure. Because Ru takes the same hcp structure as Co and has crystal lattice spacing close to that of Co, magnetic particles containing Co as a main component can be well oriented. Therefore, the crystalline orientation of the granular magnetic layer 160 can be more improved as the crystalline orientation of the ground layer 150 becomes higher. Further, by making the particle diameters in the ground layer 150 fine, the particle diameters of the magnetic particles in the granular magnetic layer 160 can be made fine. As a material of the ground layer 150, Ru is typical, but a metal of Cr, Co, or the like, or an oxide may be added into Ru. The film thickness of the ground layer 150 can be set in a range of, for example, about 5 to 40 nm.

The ground layer 150 may be formed to have a two-layered structure by changing gas pressure during sputtering. Specifically, if Ar gas pressure applied when a layer positioned on a top side of the ground layer 150 is formed is higher than that applied when a layer positioned on a bottom side thereof is formed, the particle diameters of the magnetic particles can be made fine while the crystalline orientation of the upper side granular magnetic layer 160 is maintained well.

The granular magnetic layer 160 has a column-shaped granular structure in which a non-magnetic substance containing an oxide as a main component is caused to segregate about magnetic particles of a ferromagnetic substance containing a Co—Pt-type alloy as a main component to form a grain boundary. For example, by forming a film using a target obtained by mixing $SiO_2$, $TiO_2$, or the like into a CoCrPt-type alloy, $SiO_2$ or $TiO_2$ that is the non-magnetic substance segregates around magnetic particles (grains) composed of the CoCrPt-type alloy to form a gain boundary, so that the magnetic particles can form a granular structure where magnetic particles have grown in a column shape.

Note that the substance used in the granular magnetic layer 160 described above is only one example, but this is not meant to be restrictive. As the CoCrPt-type alloy, an alloy obtained by adding at least one kind of B, Ta, Cu, or the like into CoCrPt may be used. Furthermore, it is preferred that the magnetic particles of the granular magnetic layer are caused to contain 1 at % to 5 at % of Ru. Thereby, the crystallinity of the granular magnetic layer can be improved, and accordingly the crystallinity of the auxiliary recording layer can be further improved from an initial growth stage. The non-magnetic substance forming the grain boundary may be, for example, an oxide such as silicon oxide ($SiO_2$), titanium oxide ($TiO_2$), chromium oxide ($Cr_2O_3$), zirconium oxide ($ZrO_2$), tantalum oxide ($Ta_2O_5$), or cobalt oxide (Co or $Co_3O_4$). Furthermore, it is possible to use not only one kind of oxide but also a composite oxide composed of two or more kinds of oxides.

The split layer 170 is provided between the granular magnetic layer 160 and the auxiliary recording layer 180, and serves to adjust strength of exchange coupling therebetween. Therefore, since strength of magnetic interaction acting between the granular magnetic layer 160 and the auxiliary recording layer 180 and between adjacent magnetic particles in the granular magnetic layer 160 can be adjusted, a recording and reproducing characteristic such as an overwrite characteristic or an SNR characteristic can be improved while a magnetostatic value relating to a resistance to heat fluctuation such as an Hc or an Hn is maintained. Furthermore, improvement in overwrite characteristic can diminish the role of the auxiliary recording layer 180, which can result in thinning of the auxiliary recording layer 180.

It is preferred that the split layer 170 is a layer containing Ru or Co having an hcp crystalline structure as a main component so as not to cause inheritance of a crystalline orientation to lower. As the Ru-type material, a material obtained by adding another metal element, oxygen or an oxide into Ru can be used besides Ru. Further, as the Co-type material, a CoCr alloy or the like can be used. As a specific example, Ru, RuCr, RuCo, Ru—$SiO_2$, Ru—$WO_3$, Ru—$TiO_2$, CoCr, CoCr—$SiO_2$, CoCr—$TiO_2$, or the like can be used. Incidentally, a non-magnetic substance is ordinarily used in the split layer 170, but a substance having weak magnetism may be used. Further, it is preferred that the film thickness of the split layer 170 is in a range of 0.2 to 1.0 nm in order to obtain a well exchange coupling strength.

As an action of the split layer 170 to a structure, there is a promotion of separation of crystal particles in the auxiliary recording layer 180 which is an upper layer of the split layer 170. In this embodiment, since the crystalline orientation is improved by causing the auxiliary recording layer which is an upper layer of the split layer 170 to contain Ru, it is preferred that the split layer 170 is made of a material containing an Ru alloy as a main component.

The auxiliary recording layer 180 is a magnetic layer that is approximately magnetically continuing in an in-plane direction of a main surface of the base. Since the auxiliary recording layer 180 has a magnetic interaction (exchange coupling) to the granular magnetic layer 160, it is possible to adjust a magnetostatic characteristic such as a coercive force Hc or a reversed magnetic domain nucleation magnetic field Hn, so that the auxiliary recording layer 180 is provided for improvement in resistance to heat fluctuation, OW characteristic, and SNR.

Incidentally, "magnetically continuing" means that magnetism continues without interruption. "Approximately continuing" means that the auxiliary recording layer 180 is not necessarily a single magnet when observed as a whole and the magnetism may be discontinued partially. That is, the auxiliary recording layer 180 requires only that magnetism continues across (so as to flop over) an agglomerate of a plurality of magnetic particles. In the auxiliary recording layer 180, a structure in which, for example, Cr has segregated may be adopted as long as this condition is satisfied.

A material of the auxiliary recording layer 180 contains a CoCrPtRu alloy as a main component, and may contain an additive substance such as B, Ta, or Cu. In particular by causing the material to contain Ru, the crystallinity of the auxiliary recording layer 180 can be improved. Specifically, the material can be CoCrPtRu, CoCrPtRuB, CoCrPtRuTa, CoCrPtRuCu, CoCrPtRuCuB or the like.

Ru addition to the auxiliary recording layer 180 can reduce crystalline disturbance in the initial growth stage in the auxiliary recording layer 180 accumulated on the grain boundary (oxide) in the granular magnetic layer, and consequently can improve overall crystalline orientation of the auxiliary recording layer. Therefore, it becomes possible to suppress increasing noise even if Ms is increased as well as to thin the film thickness of the auxiliary recording layer.

It is preferred that the film thickness of the auxiliary recording layer 180 is 1.5 nm to 4.0 nm. By forming the auxiliary recording layer 180 as such a thin film, reduction in noise occurring from the auxiliary recording layer 180 can be achieved. It should be noted that the SNR lowers if the film thickness is less than 1.5 nm. It is thought that this is because the effect of disturbance of the crystallinity in an initial growth stage on the SNR increases even if the auxiliary recording layer 180 is made of the above material. On the other hand, if the film thickness is more than 4.0 nm, the effect of reducing the noise cannot be obtained.

Furthermore, it is preferred that the composition of the auxiliary recording layer 180 contain 4 at % to 8 at % of Cr and 3 at % to 10 at % of Ru. Ms is further reduced by adding more Cr or Ru, but setting Cr and Ru contents in the above ranges makes it possible to obtain a good balance between high Ms and high crystallinity.

Furthermore, it is preferred that the following requirement is met:

7 at %≤(Cr content+0.65×Ru content)≤12 at %.

By setting the total sum of Cr and Ru contents in this range, saturation magnetization Ms suitable for thinning can be obtained. Here, it can be observed that Ru addition causes 0.65 times as much reduction in Ms as Cr. Therefore, considering the total sum of Cr and Ru contents, it can be comprehensively thought to be defined as (Cr content+0.65×Ru content). It is not preferred that the total sum is more than 12 at %, because Co decreases and Ms drops. It is not preferred that the total sum is less than 7 at %, because Ms becomes so high that the auxiliary recording layer constitutes a noise source.

It is preferred that the auxiliary recording layer 180 has a saturation magnetization Ms in the range of 550 [emu/cm$^3$] to 750 [emu/cm$^3$]. This makes it possible to obtain such a thin film thickness as can reduce noise while maintaining the function of the auxiliary recording layer 180 such as securing the overwrite characteristic.

The protective layer 190 is a layer for protecting the perpendicular magnetic disk 100 from an impact of the magnetic head. The protective layer 190 can be formed by forming a film containing carbon by CVD. In general, a carbon film formed by CVD has a film hardness improved as compared with that formed by sputtering, and therefore the perpendicular magnetic disk 100 can be effectively protected from an impact from the magnetic head, which is preferable. The film thickness of the protective film 190 may be set in a range of, for example, 2 to 6 nm.

The lubricating layer 200 is formed in order to prevent the protective layer 190 from being damaged when the magnetic head comes in contact with a surface of the perpendicular magnetic disk 100. For example, the lubricating layer 200 can be formed by application of PFPE (Perfluoropolyether) utilizing dip coating. The film thickness of the lubricating layer 200 may be set in a range of, for example, 0.5 to 2.0 nm.

Examples

In order to confirm effectiveness of the perpendicular magnetic disk 100 having the above configuration, explanation will be made using the following examples and comparative examples.

As examples, the adhesive layer 120 to the auxiliary recording layer 132 were sequentially formed on the base 110 in an Ar atmosphere by DC magnetron sputtering using an apparatus for film formation subjected to vacuuming. Note that an Ar gas pressure at a film formation time is 0.6 Pa unless otherwise specified. As the adhesion layer 120, a 10-nm-thick Cr-50Ti film was formed. As the soft magnetic layer 130, 20-nm-thick 92(40Fe-60Co)-3Ta-5Zr films were respectively formed so as to sandwich a 0.7-nm-thick Ru layer therebetween. As the preliminary ground layer 140, an 8-nm-thick Ni-5W film was formed. As the ground layer 150, a 10-nm-thick Ru film was formed at 0.6 Pa and a 10-nm-thick Ru film was further formed thereon at 5 Pa. As the granular magnetic layer 160, a 2-nm-thick 90(70Co-10Cr-20Pt)-10 (Cr$_2$O$_3$) film was formed at 3 Pa and a 12-nm-thick 90(69Co-10Cr-18Pt-3Ru)-5(SiO$_2$)-5(TiO$_2$) film was further formed thereon at 3 Pa. As the split layer 170, a 0.3-nm-thick Ru film was formed. As the auxiliary recording layer 180, examples and comparative examples were produced and compared with each other, as described below. As the protective layer 190, a 4.0-nm-thick film was formed by CVD using C$_2$H$_4$, and a surface layer thereof was subjected to nitriding treatment. As the lubricating layer 200, a 1-nm-thick film was formed by dip coating using PFPE.

Figure 2:
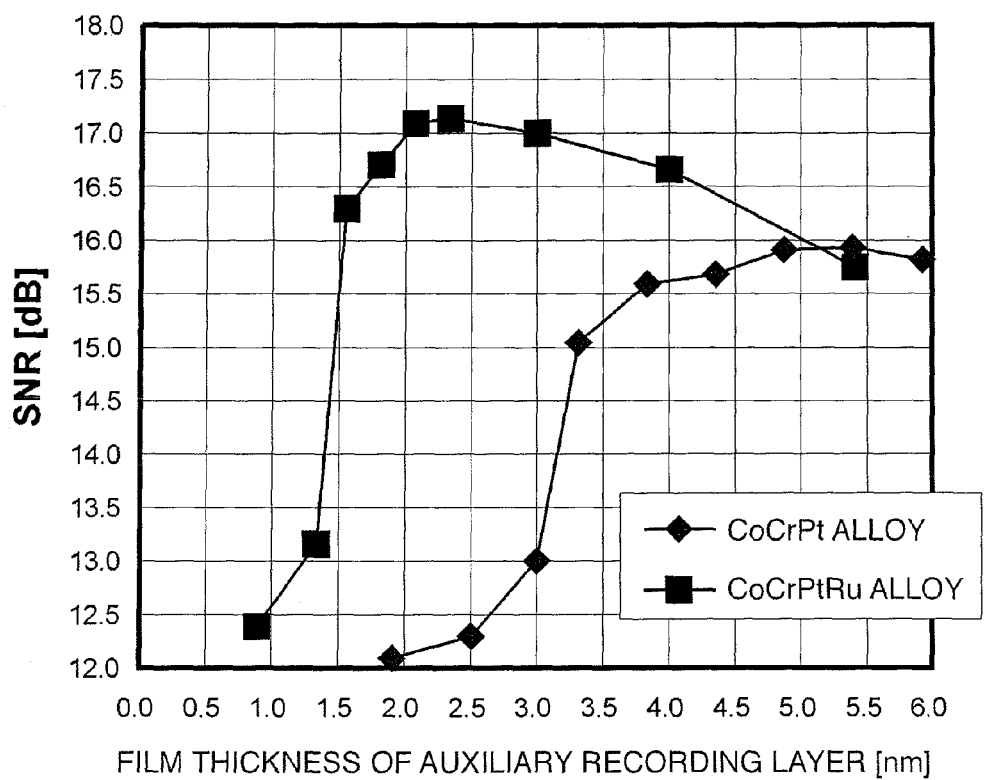
FIG. 2 is a graph for comparing a case in which Ru is added in an auxiliary recording layer and a case in which Ru is not added therein with each other.

FIG. 2 is a graph comparing a case in which Ru was added into the auxiliary recording layer 180 and a case in which Ru was not added with each other. As an example of addition of Ru, a film of a CoCrPtRu alloy (68Co-6Cr-15Pt-6Ru-5B) was formed while a film thickness thereof was changed. As an example of non-addition of Ru, a film of a CoCrPt alloy (62Co-18Cr-15Pt-5B) was formed while a film thickness thereof was changed.

Referring to FIG. 2, it is found that the auxiliary recording layer 180 composed of the CoCrPtRu alloy has a high SNR from a range in which a film thickness thereof is thin, as compared with the auxiliary recording layer 180 composed of the CoCrPt alloy. A curve showing fluctuation of the SNR transits to a thin film thickness of about 1.5 nm and the SNR is further improved, when observed as a whole. It is understood from this that thinning of the auxiliary recording layer 180 can be achieved. Further specifically, it is found that an extremely high SNR can be obtained in a film thickness range of 1.5 nm to 4.0 nm in the auxiliary recording layer 180 composed of the CoCrPtRu alloy. On the other hand, in the auxiliary recording layer 180 composed of the CoCrPt alloy (in which Ru is not contained), the most excellent SNR can be obtained in such a thick range that the film thickness is about 5 nm, but SNR nearly equal to that of the auxiliary recording layer 180 composed of the CoCrPtRu alloy cannot be obtained. From this, it is found that by using the CoCrPtRu alloy and setting the film thickness in a range of 1.5 nm to 4.0 nm, thinning can be achieved while performance required as the auxiliary recording layer is maintained, and reduction of noise occurring from the auxiliary recording layer can be achieved.

FIG. 3 is a table for describing contents of Cr and Ru in an auxiliary recording layer composed of a CoCrPtRu alloy. First, the film thicknesses in examples 1 to 3 are in the range of 1.5 nm to 4.0 nm, while the film thickness of a comparative example 1 is 1.3 nm and the film thickness of a comparative example 2 is 5.4 nm. When the threshold of a required SNR is 16.0 [dB], it can be seen that the examples 1 to 3 satisfy that value. These are the same as the data shown in FIG. 2.

Next, focusing on the Cr content, a comparative example 3 is 3 at %, an example 4 is 4 at %, an example 5 is 8 at %, and a comparative example 4 is 9 at %. From the fact that among them the examples 4 and 5 have the SNRs exceeding the threshold, it can be seen that it is preferred that the Cr content is 4 at % to 8 at %.

Focusing on the Ru content, a comparative example 5 is 2 at %, an example 6 is 3 at %, an example 7 is 10 at %, and a comparative example 6 is 11 at %. From the fact that among them the examples 6 and 7 have the SNRs exceeding the threshold, it can be seen that it is preferred that the Ru content is 3 to 10 at %. Ms is further reduced by adding more Cr or Ru, but setting Cr and Ru contents in the above ranges makes it possible to obtain a good balance between high Ms and high crystallinity, and consequently can obtain a high SNR.

Furthermore, regarding Cr and Ru contents, since both Cr and Ru are materials that reduce Ms, the total sum of Cr and Ru contents is examined in combination. It should be noted that, since Cr and Ru have different degrees of effect on Ms, the difference should be taken into account.

Figure 4:
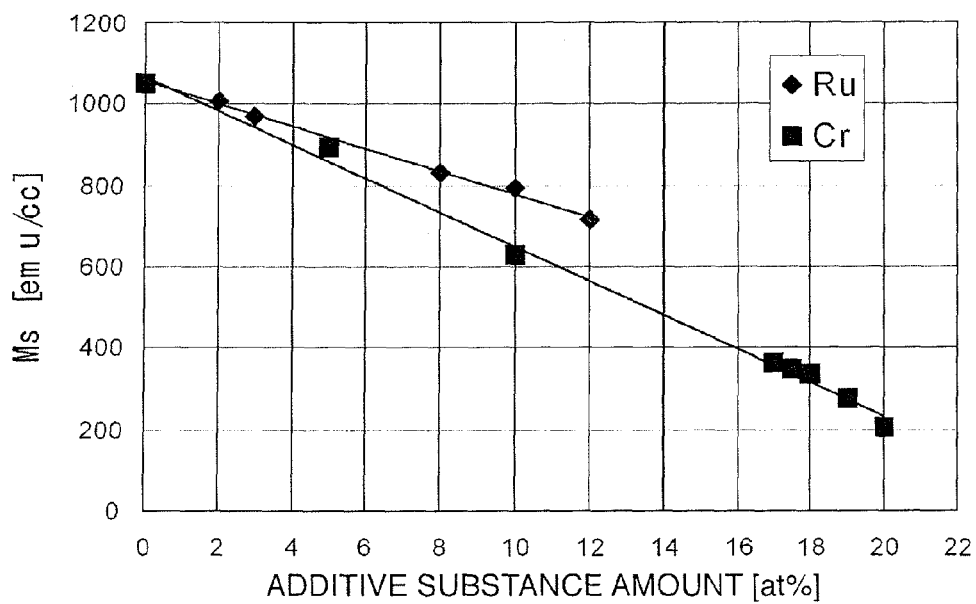
FIG. 4 is a diagram including a table and a graph, for describing the effects of Cr and Ru on Ms.

FIG. 4 is a diagram including a table and a graph, for describing the effects of Cr and Ru on Ms. In FIG. 4, the values of Ms in the cases where only Ru or Cr is added to a CoCrPt alloy are compared with each other. As shown in FIG. 4, Ms is further reduced by adding more Cr or Ru. However, according to an experiment, the degree to which Ru reduces Ms is 0.65 times larger than Cr. In other words, this means that, in order to obtain an equivalent Ms, Ru can be added 1/0.65 times more than Cr.

Therefore, focusing on (Cr content+0.65×Ru content) as a total sum of Cr and Ru contents, as shown in FIG. 3, the SNR in a comparative example 7 in which the total sum of Cr and Ru contents is 12.5 at % does not reach the threshold. At this time, Ms is also less than 550 [emu/cm$^3$]. It can be thought that the reason why Ms is low is because the total sum of Cr and Ru contents is high, and it can be thought that the reason why the SNR deteriorates is because the low Ms causes deterioration in overwrite characteristic. By comparison with an example 7 in which the Ru content is similarly 10 at %, it can be seen that it is preferred that the maximum total sum of Cr and Ru contents is 12 at %.

Similarly, the SNR in a comparative example 8 in which the total sum of Cr and Ru contents is 6.0 at % does not reach the threshold either. At this time, Ms is more than 750 [emu/cm$^3$]. It can be thought that the reason why Ms is high is because the total sum of Cr and Ru contents is low, and it can be thought that the reason why the SNR deteriorates is because the high Ms causes increase in noise. By comparison with an example 6 in which the Ru content is similarly 3 at %, it can be seen that it is preferred that the minimum total sum of Cr and Ru contents is 7 at %.

In this manner, by taking the effect on Ms into account and satisfying the requirement:

$$7 \text{ at \%} \le \text{a total sum of Cr and Ru contents} \le 12 \text{ at \%},$$

where the total sum of Cr and Ru contents represents (Cr content+0.65×Ru content), a saturation magnetization Ms suitable for thinning can be obtained. It should be noted that, it is not preferred that the total sum of Cr and Ru contents is more than 12 at % because Ms lowers and it becomes impossible to achieve thinning of the auxiliary recording layer 180. On the other hand, it is not preferred either that the total sum of Cr and Ru contents is less than 7 at % because Ms becomes too high and accordingly the noise increases.

FIG. 5 is a table for describing the effect of the concentration of Ru contained by the granular magnetic layer 160. As shown in FIG. 5, examples 8 to 12 are examples in which their Ru contents are 0 at %, 1 at %, 3 at %, 5 at %, and 6 at %, respectively. In comparison between the example 8 and the examples 9, 10, it can be seen that the SNR is improved by causing the auxiliary recording layer to contain Ru and that a higher Ru content further improves the SNR. It can be thought that this is because the crystallinity of the granular magnetic layer 160 can be improved, and accordingly the crystallinity of the auxiliary recording layer 180 is also further improved from an initial growth stage.

However, on the contrary, the SNR decreases in the example 11 (5 at %), and the SNR in the example 12 (6 at %) becomes lower than that in the example 8 (0 at %). It can be thought that this is because too much Ru is added to the granular magnetic layer 160, the amount of Co is insufficient, and the signal intensity is reduced. From these results, it can be seen that it is preferred that the granular magnetic layer 160 contains 1 at % to 5 at % of Ru.

The invention claimed is:
1. A perpendicular magnetic disk, comprising:
a base:
a granular magnetic layer; and
an auxiliary recording layer disposed as an upper layer of the granular magnetic layer, wherein
the granular magnetic layer has a granular structure in which a grain boundary portion is formed by segregation of a non-magnetic substance containing an oxide as a main component around magnetic particles containing a CoCrPt alloy grown in a columnar shape as a main component,
the auxiliary recording layer contains a CoCrPtRu alloy as a main component and has a film thickness in range of 1.5 nm to less than 4.0 nm, and
the signal to noise ratio (SNR) is at least 16.0 [dB].
2. The perpendicular magnetic disk according to claim 1, wherein the auxiliary recording layer contains 4 at % to 8 at % of Cr and 3 at % to 10 at % of Ru.
3. The perpendicular magnetic disk according to claim 1, wherein the auxiliary recording layer meets the requirement:

$$7 \text{ at \%} \le (\text{Cr content} + 0.65 \times \text{Ru content}) \le 12 \text{ at \%}.$$

4. The perpendicular magnetic disk according to claim 1, wherein the auxiliary recording layer has a saturation magnetization Ms in the range of 550 [emu/cc] to 750 [emu/cc].
5. The perpendicular magnetic disk according to claim 1, wherein the magnetic particles of the granular magnetic layer are caused to contain 1 at % to 5 at % of Ru.

6. The perpendicular magnetic disk according to claim 1, wherein a split layer containing an Ru alloy as a main component is provided between the granular magnetic layer and the auxiliary recording layer.

* * * * *